(12) United States Patent
Mehlos et al.

(10) Patent No.: US 10,836,493 B2
(45) Date of Patent: *Nov. 17, 2020

(54) TABLE APPARATUS

(71) Applicant: Adient Aerospace LLC, Bothell, WA (US)

(72) Inventors: James Mehlos, Everett, WA (US); Jonathan Peter Cansfield, Dexter, MI (US); James Davis, Shoreline, WA (US); Benjamin McGeever, Shoreline, WA (US); David P. Heiss, Mukilteo, WA (US)

(73) Assignee: ADIENT AEROSPACE LLC, Bothell, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,222

(22) Filed: Jun. 10, 2019

(65) Prior Publication Data

US 2019/0291869 A1  Sep. 26, 2019

Related U.S. Application Data

(63) Continuation of application No. 15/850,806, filed on Dec. 21, 2017, now Pat. No. 10,364,033.

(51) Int. Cl.
  *B64D 11/00* (2006.01)
  *B64D 11/06* (2006.01)
  *B60N 3/00* (2006.01)

(52) U.S. Cl.
  CPC ......... *B64D 11/0605* (2014.12); *B60N 3/002* (2013.01); *B64D 11/0638* (2014.12); *B64D 11/0646* (2014.12)

(58) Field of Classification Search
  CPC .......... B60N 3/00; B60N 3/004; B60N 3/002; B64D 11/0638; B64D 11/0015; B64D 11/00152; B64D 11/0624; B64D 11/0605; B64D 11/0646; A47C 7/70; A47G 11/006; A47G 11/004; A47B 81/002; A47B 2003/145; A47B 23/044; A47B 3/002; A47B 3/082; A47B 83/02; A47B 3/0818; B61D 37/00; B60R 7/04
  USPC ..... 296/24.34, 1.09, 37.8; 108/25, 137, 143, 108/44, 42, 93, 102, 103; 297/188.21, 297/157.1, 158.2, 158.4, 162, 163, 173,
  (Continued)

(56) References Cited

U.S. PATENT DOCUMENTS 2,008,078 A * 7/1935 Martin .................. A47B 25/00
  108/26
4,235,490 A * 11/1980 Schwartz ........... G11B 23/0236
  206/387.14
(Continued)

FOREIGN PATENT DOCUMENTS

DE  4343242  *  6/1995
EP  2052906  *  4/2009
(Continued)

*Primary Examiner* — Janet M Wilkens
(74) *Attorney, Agent, or Firm* — McGlew and Tuttle, P.C.

(57) ABSTRACT

A table apparatus includes a table device and a table support structure that is connected to the table device. The table support structure includes a carrier structure and a table support linkage. The carrier structure is connected to the table support linkage via a single pivot connection. The table device is pivotable about only the single pivot connection.

12 Claims, 14 Drawing Sheets

(58) Field of Classification Search
USPC ....... 297/188.2, 164, 174 R, 411.32, 411.21, 297/411.3
See application file for complete search history.

(56) References Cited

U.S. PATENT DOCUMENTS

| | | | | |
|---|---|---|---|---|
| 4,436,356 | A * | 3/1984 | Stelling | H05B 6/6402 108/93 |
| 5,217,262 | A * | 6/1993 | Kurosaki | E05C 19/022 292/6 |
| 6,247,733 | B1 * | 6/2001 | Weiland | E05B 39/00 292/228 |
| 6,669,250 | B1 * | 12/2003 | St. Louis | E05C 19/022 292/304 |
| 10,364,033 | B2 * | 7/2019 | Mehlos | B64D 11/0605 |
| 2008/0030111 | A1 * | 2/2008 | Liu | A47B 88/463 312/221 |
| 2009/0039745 | A1 * | 2/2009 | Wong | E05B 65/44 312/333 |
| 2009/0058152 | A1 * | 3/2009 | Orlo | B60N 2/206 297/163 |
| 2009/0078169 | A1 * | 3/2009 | Osborne | A47B 5/006 108/40 |
| 2009/0266954 | A1 * | 10/2009 | Kordecki | A47C 7/70 248/220.21 |
| 2012/0167807 | A1 * | 7/2012 | Legeay | B60N 3/002 108/41 |
| 2013/0076054 | A1 * | 3/2013 | Graham | A47G 23/06 294/146 |
| 2014/0319867 | A1 * | 10/2014 | von Rothkirch | B60N 3/002 296/24.34 |
| 2015/0284088 | A1 * | 10/2015 | Gow | B64D 11/0638 297/174 R |
| 2016/0090180 | A1 * | 3/2016 | Thompson | B60N 3/002 297/144 |
| 2018/0279779 | A1 * | 10/2018 | Foohey | A47B 83/02 |
| 2018/0279790 | A1 * | 10/2018 | Pozzi | A47B 46/00 |
| 2018/0281652 | A1 * | 10/2018 | Foohey | B60N 3/004 |
| 2018/0305023 | A1 * | 10/2018 | Moulton | B64D 11/0605 |

FOREIGN PATENT DOCUMENTS

| | | | |
|---|---|---|---|
| EP | 2228255 | * | 9/2010 |
| FR | 2911548 | * | 7/2008 |
| FR | 3014049 | * | 6/2015 |
| WO | 2011141680 | * | 11/2011 |
| WO | 2015155682 | * | 10/2015 |

* cited by examiner

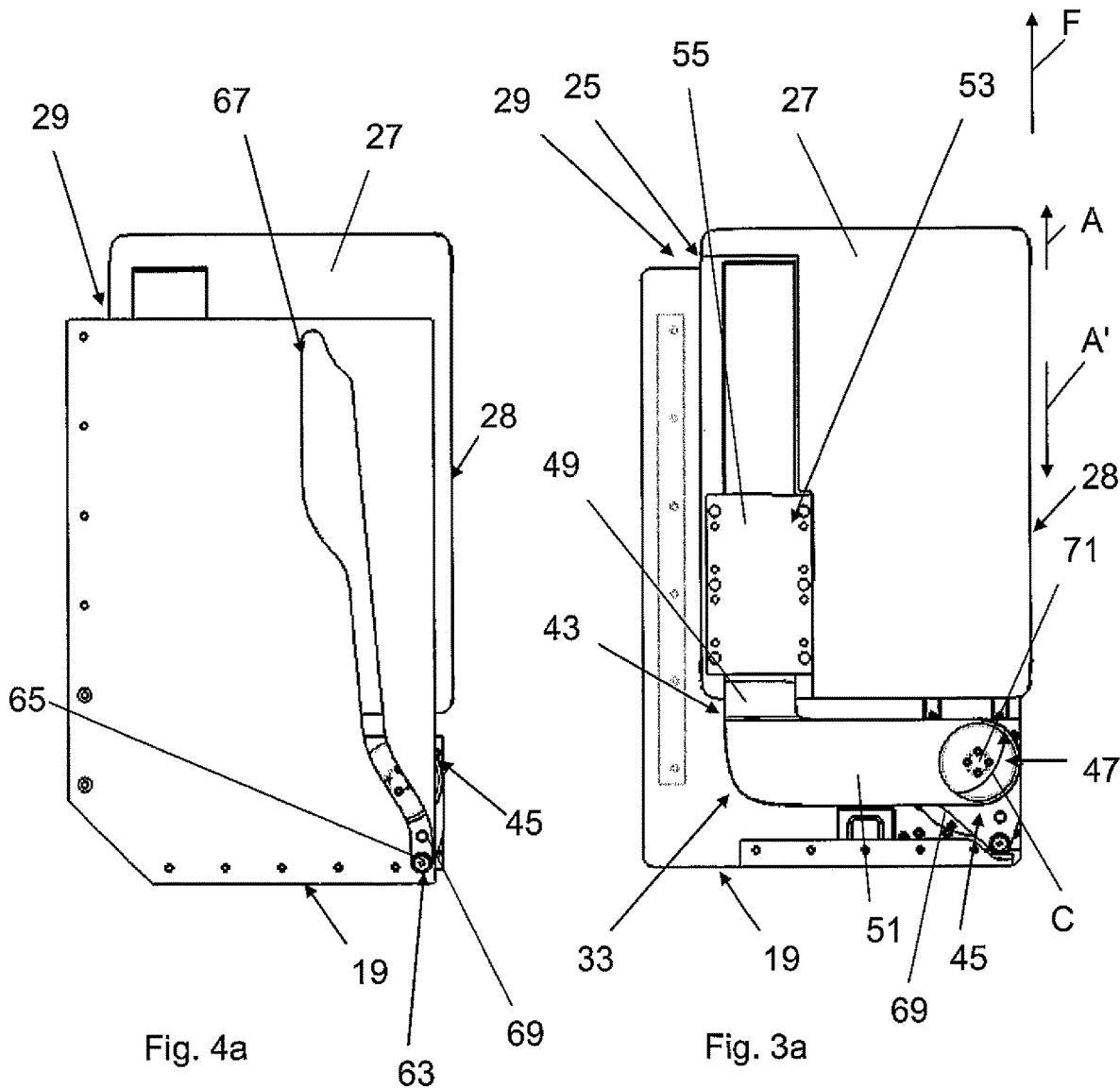

TABLE APPARATUS

CROSS REFERENCE TO RELATED APPLICATIONS

This application is a continuation application and claims the benefit of priority under 35 U.S.C. § 120 of U.S. patent application Ser. No. 15/850,806 filed Dec. 21, 2017, the entire contents of which are incorporated herein by reference.

FIELD OF THE INVENTION

The present invention relates to a table apparatus, in particular a table apparatus for a vehicle seat.

BACKGROUND OF THE INVENTION

EP 2155554 B1 discloses a table apparatus for a vehicle seat having a table, having at least one table leaf, and a table support mechanism. The table support mechanism enables translational movement of the table between a substantially horizontal stowed configuration and a deployed configuration. A linkage arrangement of the table support mechanism includes at least one substantially horizontally extending support arm extending from a table support member. The table is mounted upon a distal end of the support arm. The support arm is pivotally connected to the table support member for rotation about a first pivot axis in a substantially horizontal plane about the support member. The table is pivotally connected to the distal end of the support arm for rotation about a second pivot axis in a substantially horizontal plane.

WO 16209923 A1 discloses a table movable between a fully stowed position forward of a seat and a fully deployed position over the seat through at least one intermediate position in which the table rotates relative to a support arm to provide room for a passenger to exit the seat between the seat and the table without having to fully stow the table.

US 2016/288911 A1 discloses an aircraft seat device comprising at least one table device which comprises at least one table surface and at least one adjustment device, which is provided for the purpose of adjusting the table surface between a stowed position and a use position. The adjustment device is provided for the purpose of moving the table surface in a linear displacement movement and a rotational movement at least substantially in one plane during an adjustment between the stowed position and the use position.

Conventional table apparatuses, in particular conventional table apparatuses for a vehicle seat, provide complicated mechanisms for deploying a table. Conventional table apparatuses include two or more pivot connections that are necessary in order to move a table from a stowed position to a deployed position. This significantly increases manufacturing costs associated with such conventional table apparatuses due to the complexity of connections of the conventional table apparatuses.

SUMMARY OF THE INVENTION

An object of the present invention is to provide a table apparatus that has less complicated connections so that the table apparatus can be manufactured quicker and more efficiently to decrease manufacturing time and costs.

Another object of the present invention is to provide a table apparatus that is simple to use and can be easily operated by a passenger.

According to the present invention, a table apparatus comprises a table device (table structure) and a table support structure is connected to the table device. The table support structure comprises a carrier structure and a table support linkage. The carrier structure is connected to the table support linkage via a single pivot connection. The table device is pivotable about only the single pivot connection.

The table apparatus may further comprise a track structure, a guide track and a guide pin arranged in the guide track. The guide pin may be connected to the carrier structure. The carrier structure may be movably mounted to the track structure such that the carrier structure moves in a linear direction and the guide pin moves in the guide track when the carrier structure moves in the linear direction.

The table device may be movable between a stowed position and a deployed position based on movement of the carrier structure and the table support linkage. The table device may comprise an outer edge surface. The outer edge surface may define one lateral side of the table device in the stowed position. The outer edge surface may define a rear side of the table device in the deployed position.

The outer edge surface may be parallel to the track structure in the stowed position. The outer edge surface may be perpendicular to the track structure in the deployed position.

The track structure and the guide track may be connected to a console structure located adjacent to a vehicle seat structure. The console structure may comprise an opening. At least a portion of the table device may be arranged in the opening in the stowed position. The deployed position may be located outside of the opening.

The pivotable connection may be defined by at least the carrier structure and the table support linkage.

The table support linkage may comprise a first table support linkage member and a second table support linkage member. The first table support linkage member may be perpendicular to the second table support linkage member.

The first table support linkage member may be perpendicular to the track structure when the table device is in the stowed position. The first table support linkage member may be parallel to the track structure in the deployed position. The second table support linkage member may be parallel to the track structure when the table is in the stowed position. The second table support linkage member may be perpendicular to the track structure when the table device is in the deployed position.

According to the present invention, a table apparatus comprises a table device and a table support structure connected to the table device. The table support structure comprises a carrier structure and a table support linkage. The carrier structure is pivotably connected to the table support linkage. The table support linkage pivots about a single pivot axis relative to the carrier structure. The table device pivots only about the single pivot axis.

According to the present invention, a table apparatus comprises a table device and a table support structure connected to the table device. The table support structure defines a single pivot point. The table device pivots about only the single pivot point.

The table support structure may comprise a carrier structure and a table support linkage. The carrier structure may be pivotably connected to the table support linkage. At least the carrier structure and the table support linkage may define single pivot point. The table support linkage may pivot about the single pivot point relative to the carrier structure. The table device may pivot only about the single pivot point relative to the carrier structure.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3a is a bottom view of the table apparatus in a stowed position;

FIG. 4a is a top view of the table apparatus in the stowed position;

DESCRIPTION OF THE PREFERRED EMBODIMENTS

Figure 1A:
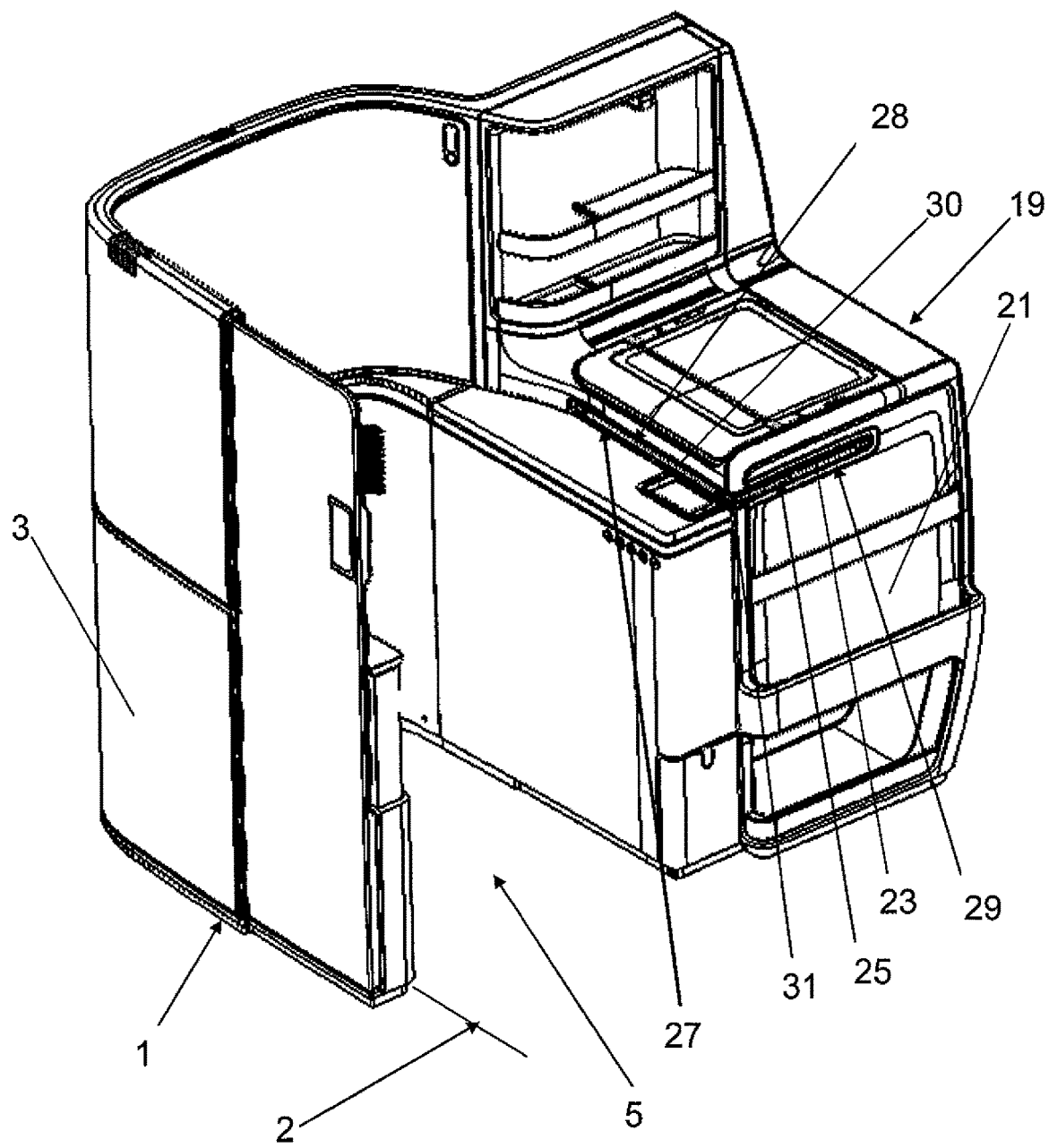
FIG. 1a is a perspective view of a seating module with a table apparatus in a stowed position.

Referring to the drawings in particular, FIG. 1 is a partial perspective view of a seating module 1 for a vehicle 2. The seating module includes a shell structure 3. The shell structure 3 includes a seating area 5 that defines an area for a seat 7 (see FIG. 1e). As shown in FIG. 1e, the seat 7 includes a backrest structure 9 and a user support structure (cushion) 11. The backrest structure 9 engages at least a lumbar portion of a user. The user support structure 11 engages at least a buttock portion and a leg portion of the user. Seat 7 includes a leg support structure 13 that can be deployed to support at least a lower portion of a user's legs. Armrests 15, 17 are connected to the seat for supporting a user's arm. A console 19 is located adjacent to one of the armrests 15. The console 19 includes a footwell 21. The footwell 21 faces in a direction E away from the seating module 1 toward another seating module located behind the seating module 1. The direction E may be opposite a direction of travel F of the vehicle 2. The console 19 has an opening 23. A table apparatus 25 is stowed in a stowed position 29 in the console 19 as shown in FIG. 1. The table apparatus 25 includes a table device (table structure) 27. The table device 27 may be a tray table. The table device 27 includes an outer table surface 28. A latch release mechanism 31 locks the table apparatus 25 in the stowed position 29. In the stowed position 29, the outer table surface 28 defines a side edge 30 of the table device 27.

Figure 1B:
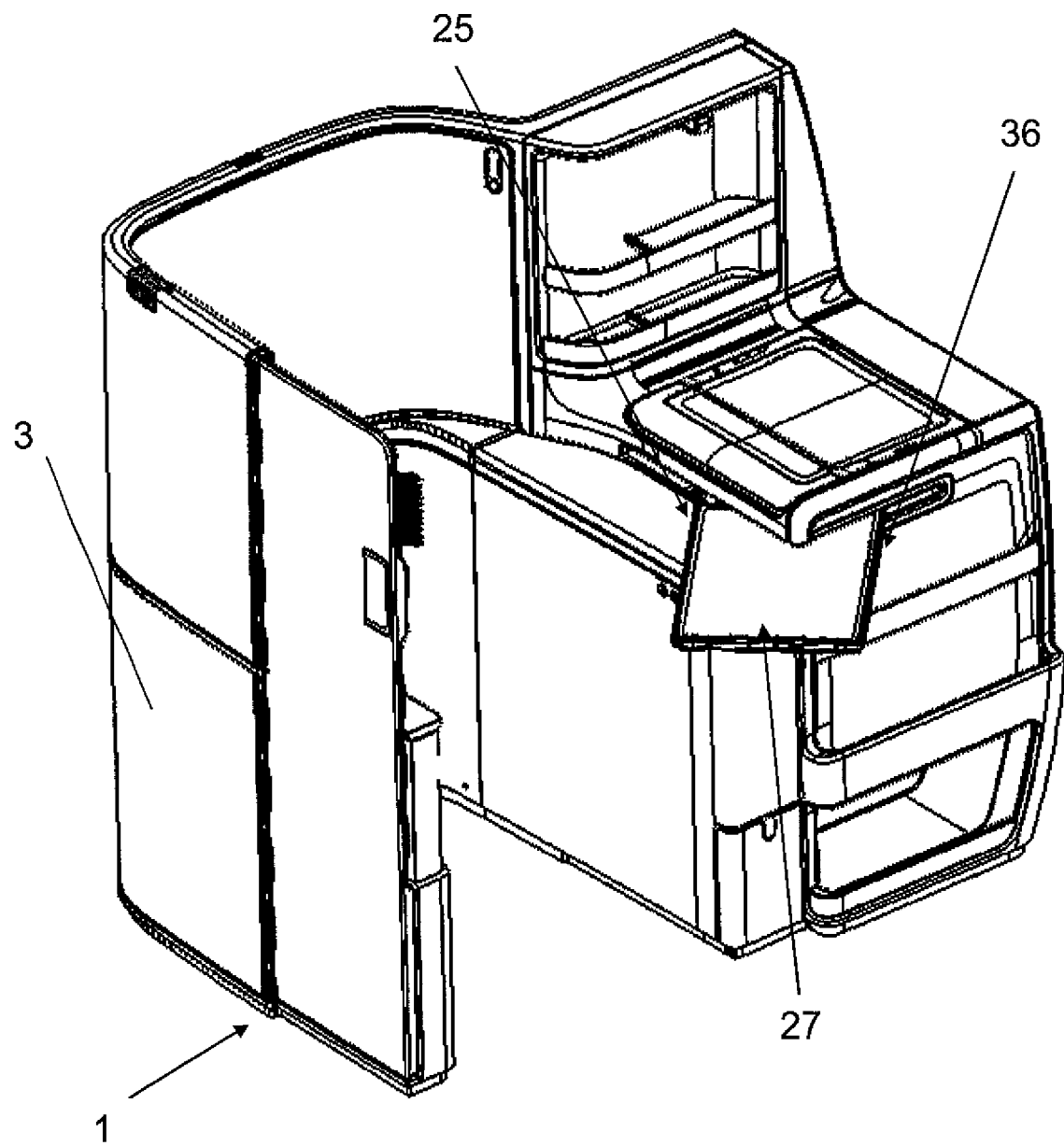
FIG. 1b is a perspective view of the seating module of FIG. 1a with the table apparatus in an intermediate deployed position.
Figure 1C:
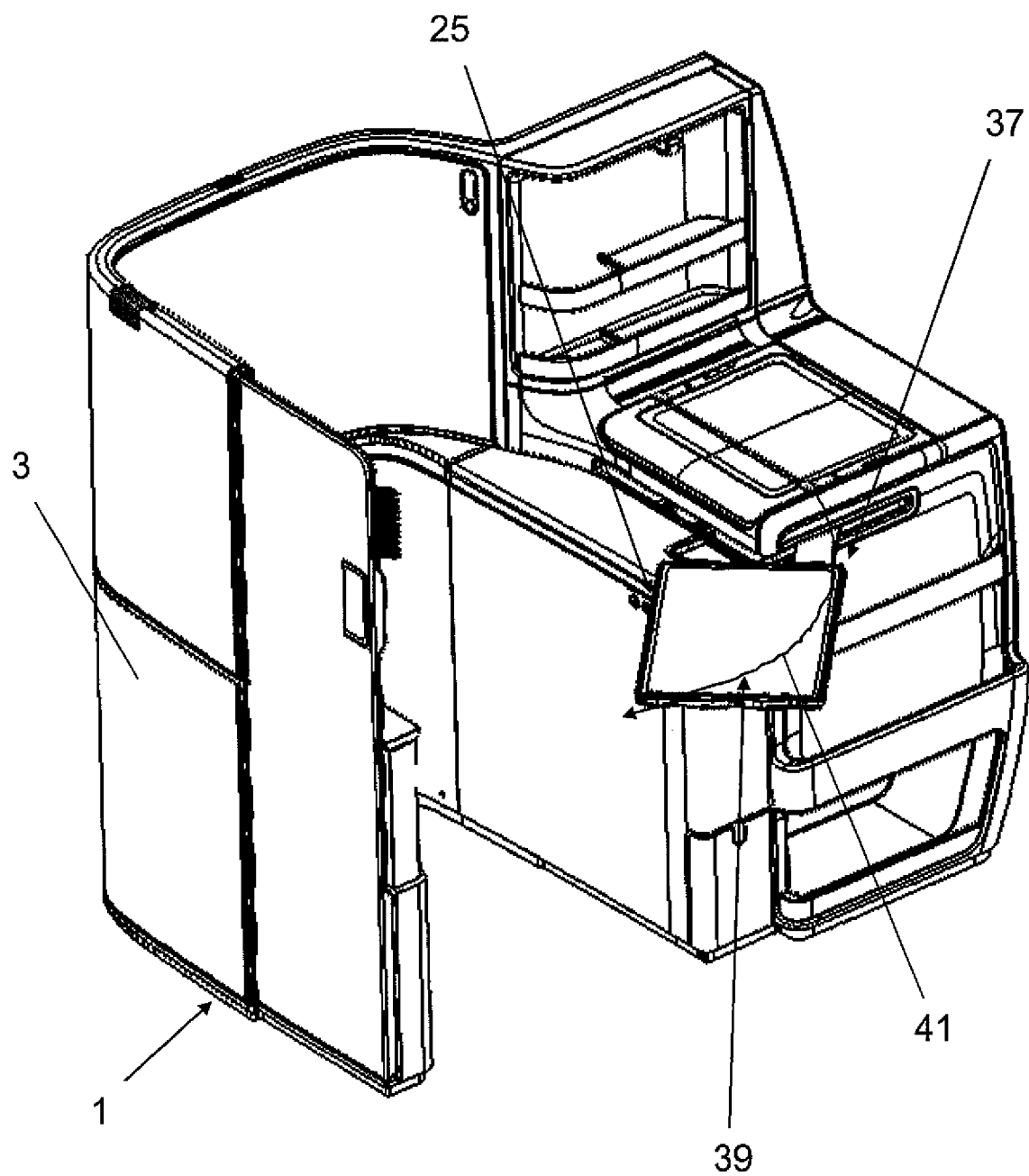
FIG. 1c is a perspective view of the seating module of FIG. 1b with the table apparatus in an another intermediate deployed position.
Figure 1D:
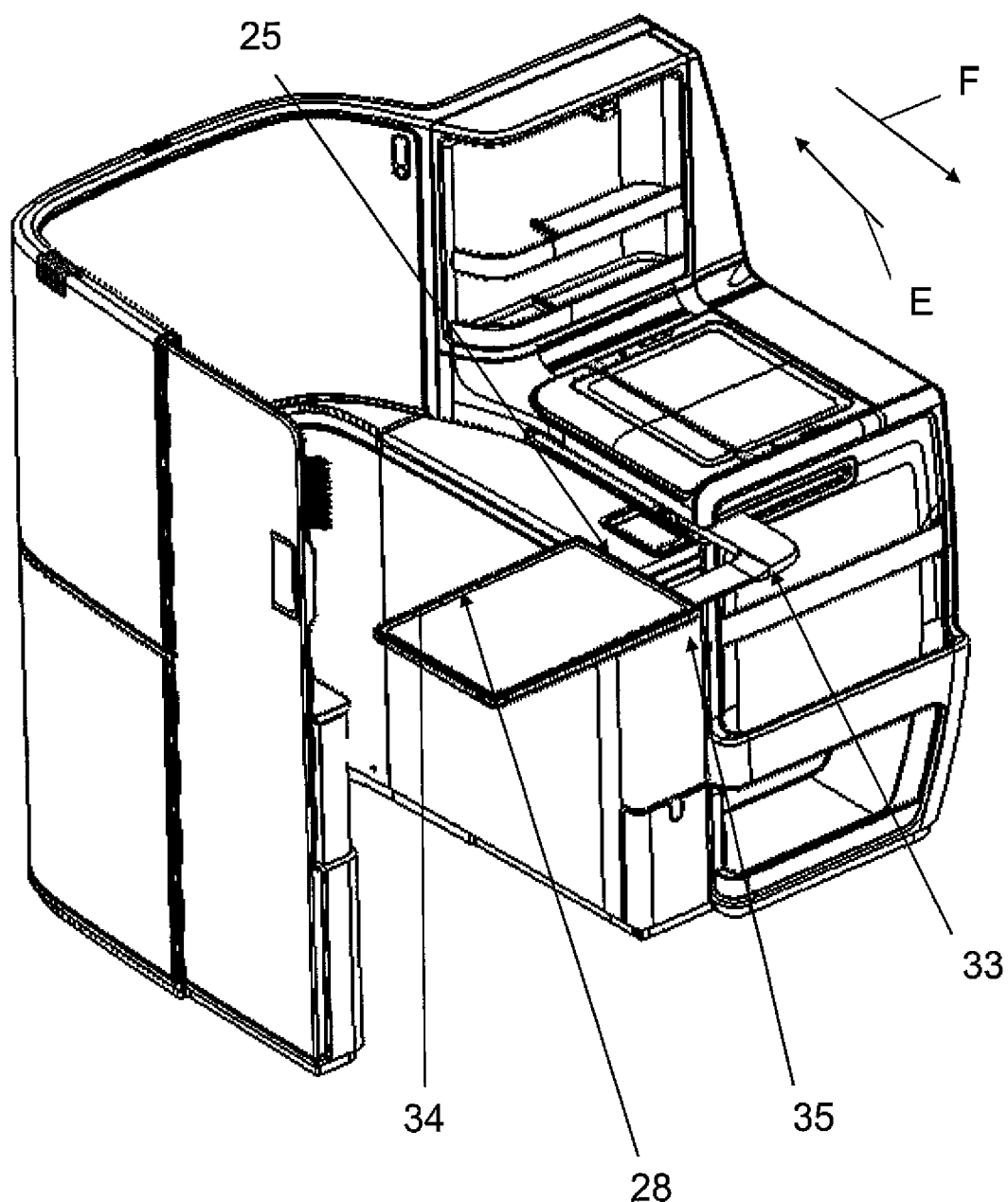
FIG. 1d is a perspective view of the seating module of FIG. 1c with the table apparatus in a fully deployed position.
Figure 1E:
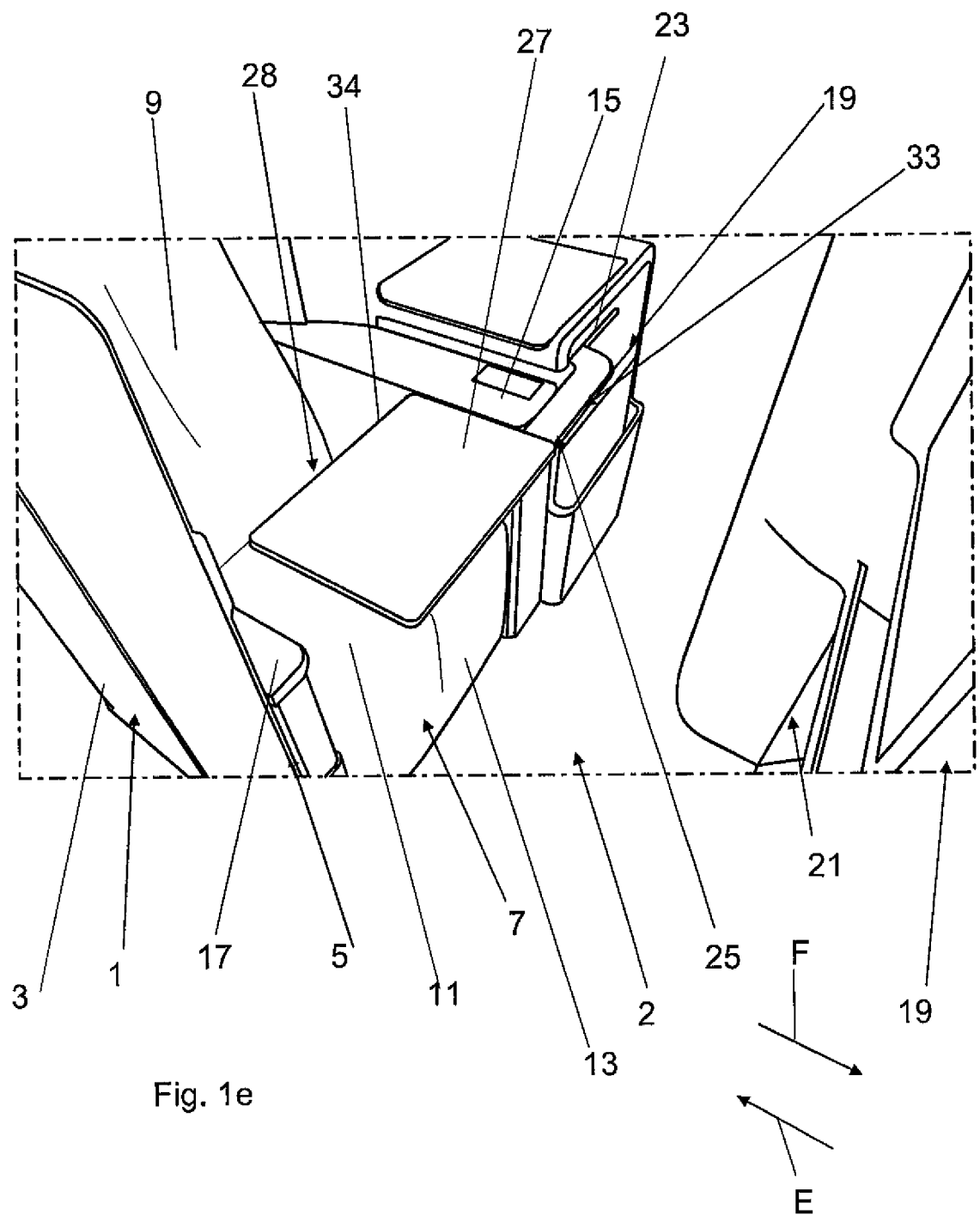
FIG. 1e is a partial perspective view of the seating module of FIG. 1a arranged behind another seating module with the table apparatus in a fully deployed position.

FIGS. 1a, 1b, 1c and 1d show the movement of the table apparatus 25 from the stowed position as shown in FIG. 1a to an intermediate deployed position 36 shown in FIG. 1b to another intermediate deployed position 37 shown in FIG. 1c to a fully deployed position 35 as shown in FIG. 1d and FIG. 1e. The table apparatus 25 is able to move from the deployed position as shown in FIG. 1d to the another intermediate deployed position 37 as shown in FIG. 1c to the intermediate deployed position 36 as shown I FIG. 1b to the stowed position shown in FIG. 1a.

Figure 2:
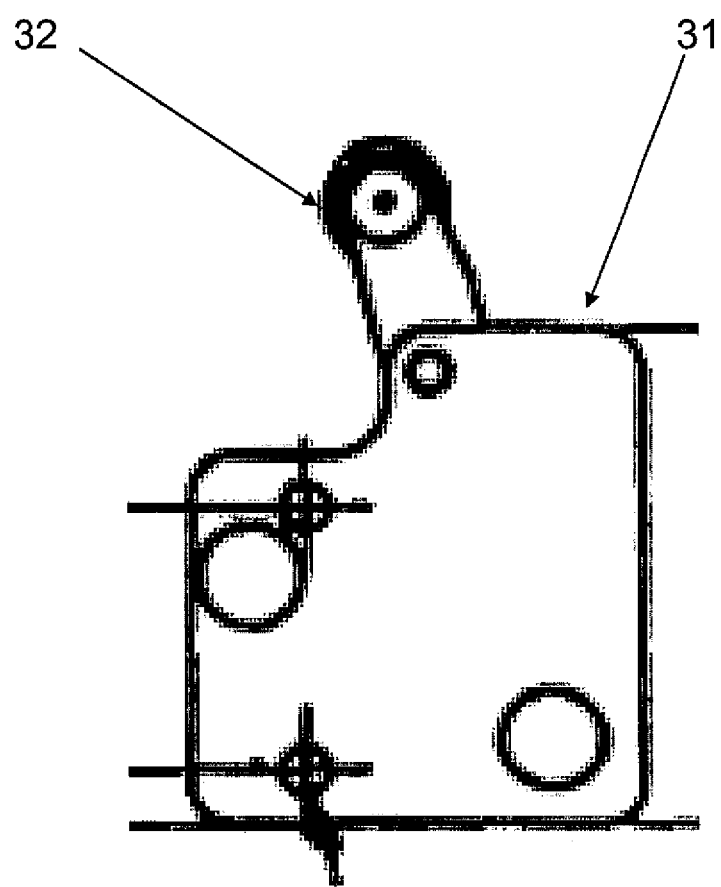
FIG. 2 is top view of a latch release mechanism.

FIG. 2 is top view of the latch release mechanism 31. The latch release mechanism 31 includes a movable latch 32. The latch release mechanism 31 can be actuated by pressing on the table apparatus 25. In the stowed position, the latch release mechanism 31 can be unlocked by pressing the table apparatus 25 against the movable latch 32 such that the movable latch 32 moves from a locked position to an unlocked position. With the movable latch 32 in the unlocked position, the table apparatus 25 can be deployed by a user moving the table apparatus 25. In another embodiment, the table apparatus 25 may be deployed via a linear drive until the deployed or use position has been reached. Upon stowing the table apparatus 25, the table apparatus 25 is pushed from the fully deployed position into the stowed position such that the table apparatus 25 presses against the movable latch 32 such that the movable latch 32 is in a locked position. The table apparatus 25 is connected to a table support structure 33 (see FIGS. 1d and 1e).

FIG. 1c is a perspective view of the table apparatus 25 after the latch release mechanism 31 is unlocked to release the table apparatus 25. The table apparatus 25 is shown in the another intermediate position 37 in FIG. 1c. After the latch release mechanism 31 is released, the table apparatus 25 travels along a table apparatus movement path 39 from the stowed position to the intermediate position 36 to the another intermediate position 37 to the fully deployed position 35. It is understood that the table apparatus 25 may be moved to any number of positions between the stowed position 29 and the fully deployed position 35. The table apparatus movement path 39 is a non-linear semi-curved movement path 41.

FIG. 1e is a partial perspective view of the table apparatus 25 in a fully deployed position 35. In the fully deployed position 35, the table edge surface 28 defines a rear edge surface 34 of the table device 27. In the fully deployed position, the table edge surface 28 extends in a direction traversing the direction of travel F such that the table edge surface 28 is perpendicular to the direction of travel F.

Figure 3B:
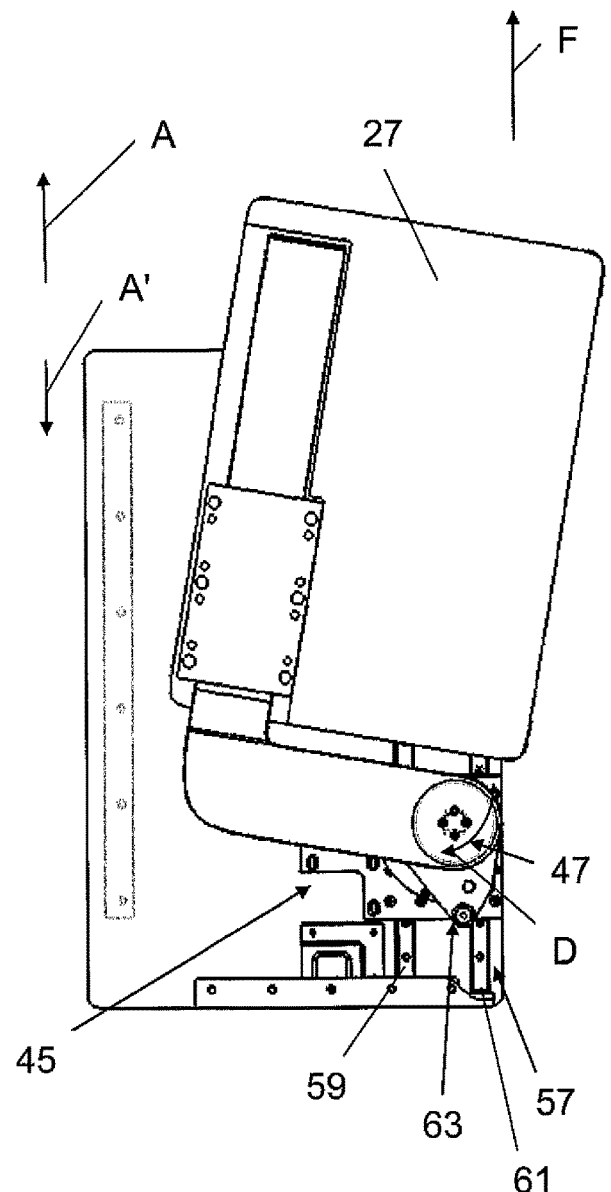
FIG. 3b is a bottom view of the table apparatus of FIG. 3a in an intermediate deployed position.
Figure 3C:
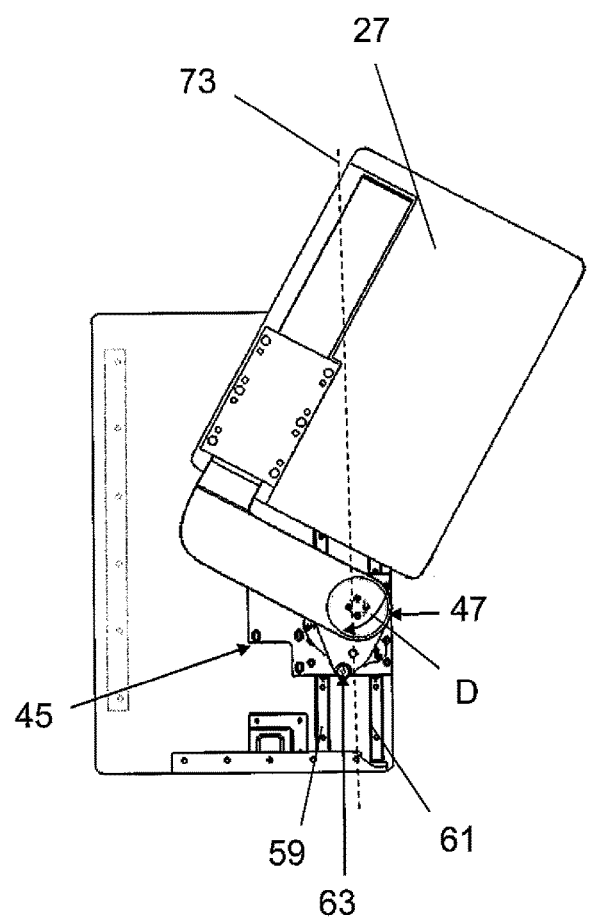
FIG. 3c is a bottom view of the table apparatus of FIG. 3b in an another intermediate deployed position.
Figure 3D:
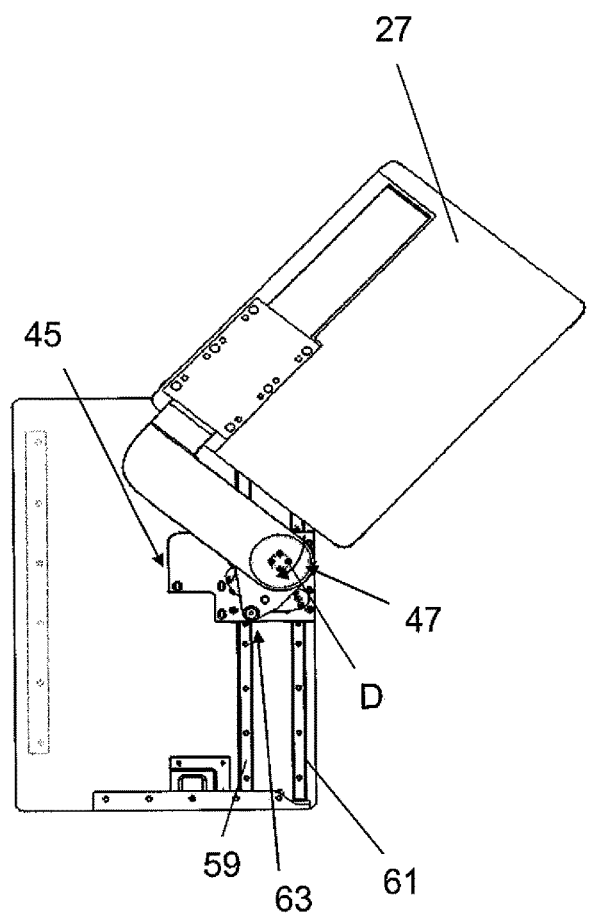
FIG. 3d is a bottom view of the table apparatus of FIG. 3c in yet another intermediate deployed position.
Figure 3F:
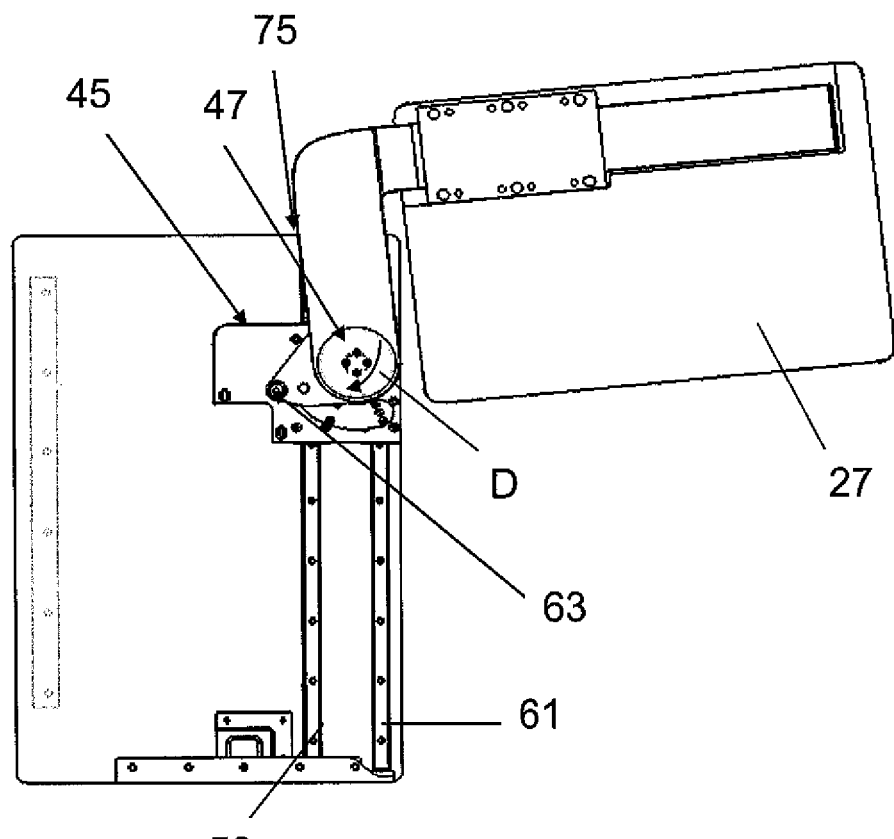
FIG. 3f is a bottom view of the table apparatus of FIG. 3e in yet another intermediate deployed position.
Figure 3G:
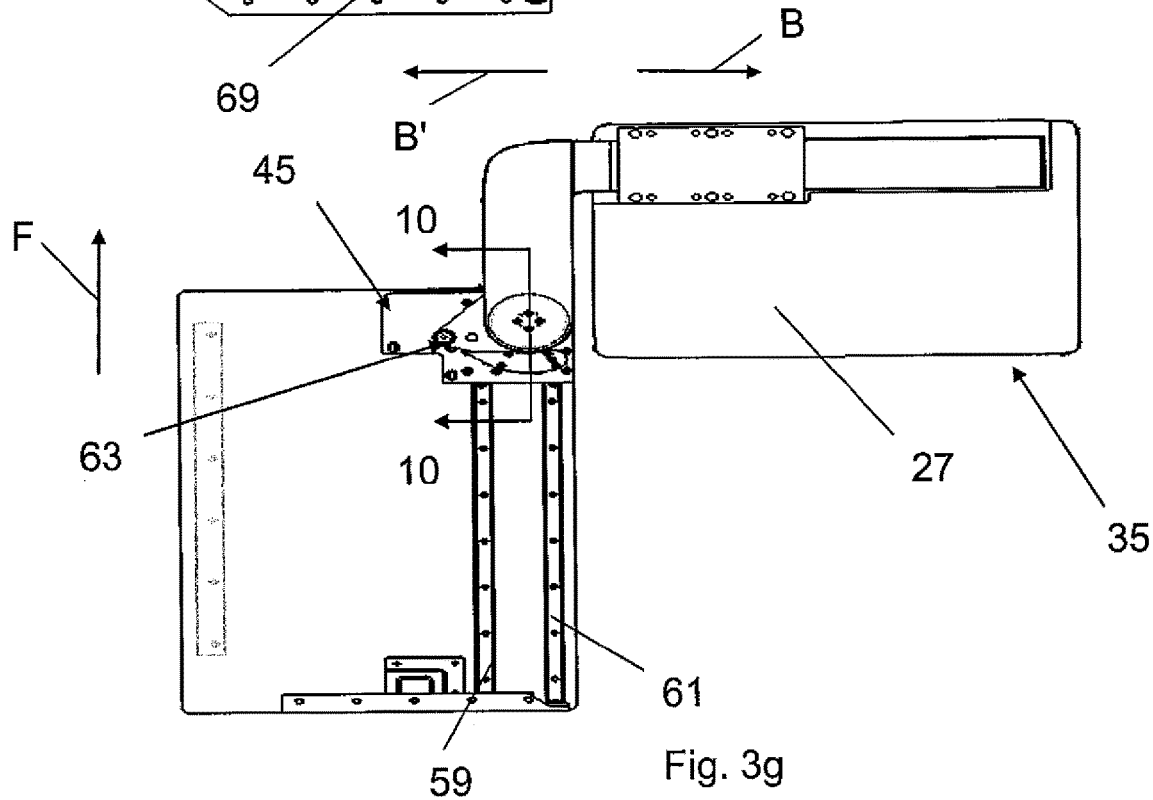
FIG. 3g is a bottom view of the table apparatus of FIG. 3f in yet another intermediate deployed position.

FIGS. 3a, 3b, 3c, 3d, 3e, 3f and 3g are bottom views of the table apparatus 25 showing the sequence of movement of the table apparatus 25 from the stowed position 29 as shown in FIG. 3a through intermediate deployed positions as shown in FIGS. 3b, 3c, 3d, 3e and 3f to the fully deployed position 35 as shown in FIG. 3g. The table apparatus 25 is able to move from the fully deployed position 35 as shown in FIG. 3g through the intermediate deployed positions as shown in FIGS. 3f, 3e, 3d, 3c, 3b to the stowed position 29 shown in FIG. 3a. It is understood that the table apparatus 25 may be moved to any number of positions between the stowed position 29 and the fully deployed position 35. The table support structure 33 includes a table support linkage 43 and a carrier structure 45. The table support linkage 43 is connected to the carrier structure 45 via a single pivot connection 47. The pivot connection 47 is the only pivot connection of the table apparatus 25. The pivot connection 47 allows the table device 27 and the table support linkage 43 to rotate in a first rotational direction C and a second rotational direction D. The pivot connection 47 defines a single pivot point about which the table device 27 and the table support linkage 43 pivot (rotate). The table support linkage 43 includes a first table support linkage member 49 and a second table support linkage member 51. The first table support linkage member 49 is perpendicular to the second table support linkage member 51. The first table support linkage member 49 may be integrally connected to the second table support linkage member 51 to form a one-piece table support structure. The table device 27 is connected to the first table support linkage member 49 by a table linkage connecting structure 53. The table linkage connecting structure 53 is in the form of a linear slide member 55. The table linkage connecting structure 53 is movably mounted to the table linkage connecting structure 53 such that the table device 27 is movable in a direction B and a direction B' independent of the movement of the carrier structure 45 (see FIG. 3g). The direction B and the direction B' traverse the direction of travel F. The direction B and the direction B' is perpendicular to the direction of travel F. The first table support linkage member 49 may have one or more recesses and the linear slide member 55 may have one or more projections. Each projection may be inserted in a respective recess to detachably lock the table device 27 relative to the table support linkage 43, in particular the first table support linkage member 49.

The carrier structure 45 is movably mounted to a rail (track) structure 57. The rail structure 57 includes a first rail (track) member 59 and a second rail (track) member 61. The first rail 59 and the second rail member 61 extend in a direction parallel to the direction of travel F. The carrier structure 45 is movable along the rail structure 57 in a direction A and in a direction A', which are parallel to the direction of travel F. The carrier structure 45 is connected to a guide member 63. The guide member 63 is movable along a guide track 67. The guide track 67 is formed by a slot 69 formed in an upper inner surface 68 of the console 19. In another embodiment, the guide track 67 may be formed by rails attached to an upper inner surface of the console 19.

Figure 4B:
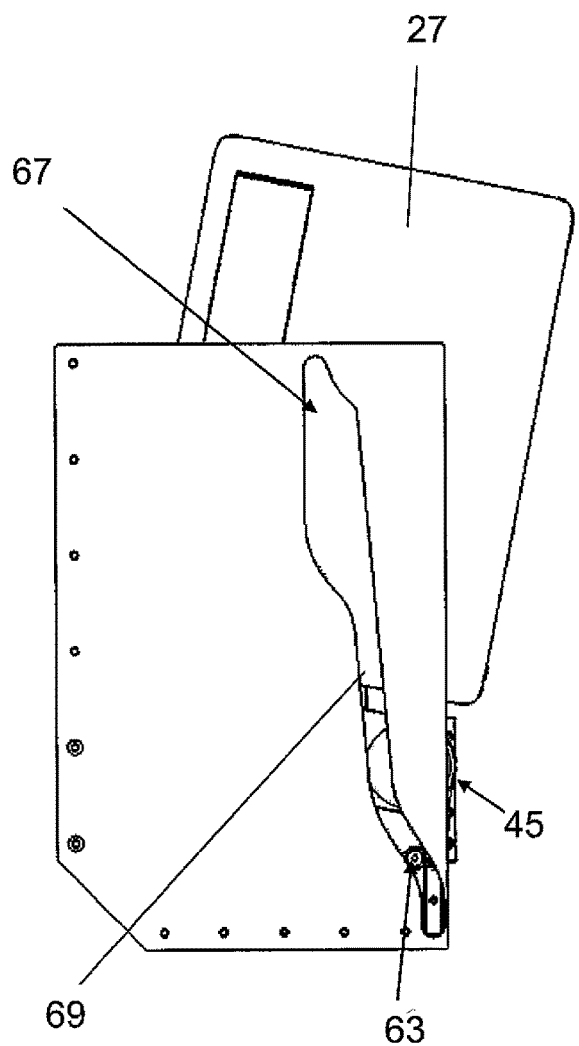
FIG. 4b is a top view of the table apparatus of FIG. 4a in the intermediate deployed position.
Figure 4C:
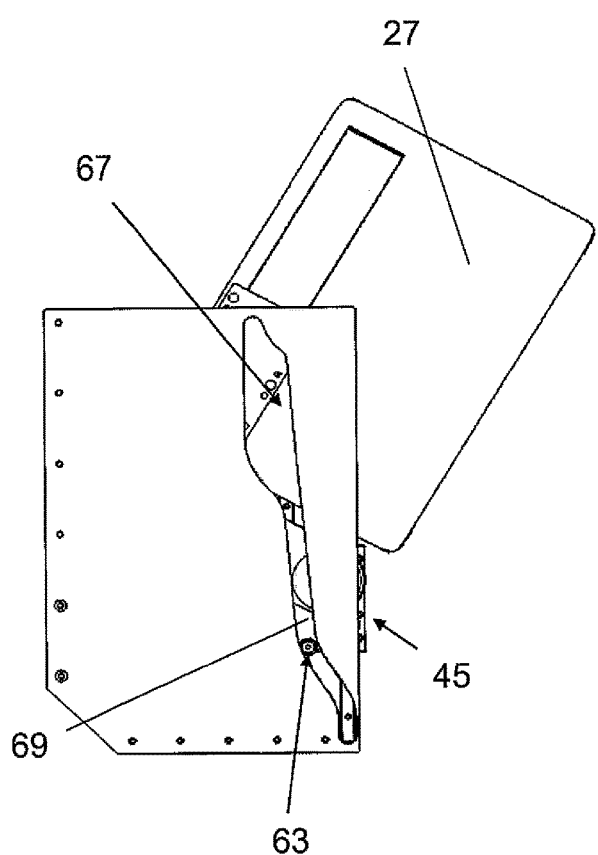
FIG. 4c is a top view of the table apparatus of FIG. 4b in the another intermediate deployed position.
Figure 4D:
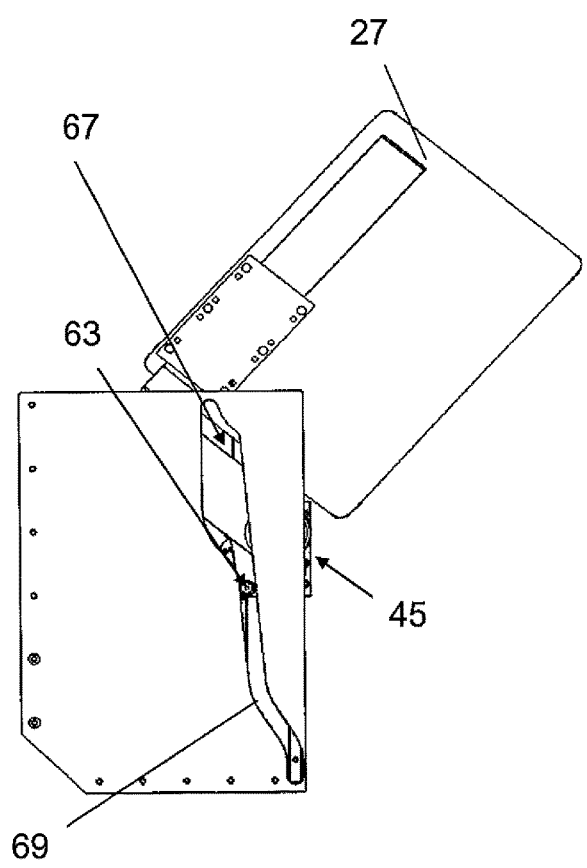
FIG. 4d is a top view of the table apparatus of FIG. 4c in the yet another intermediate deployed position.
Figures 3E, 4E:
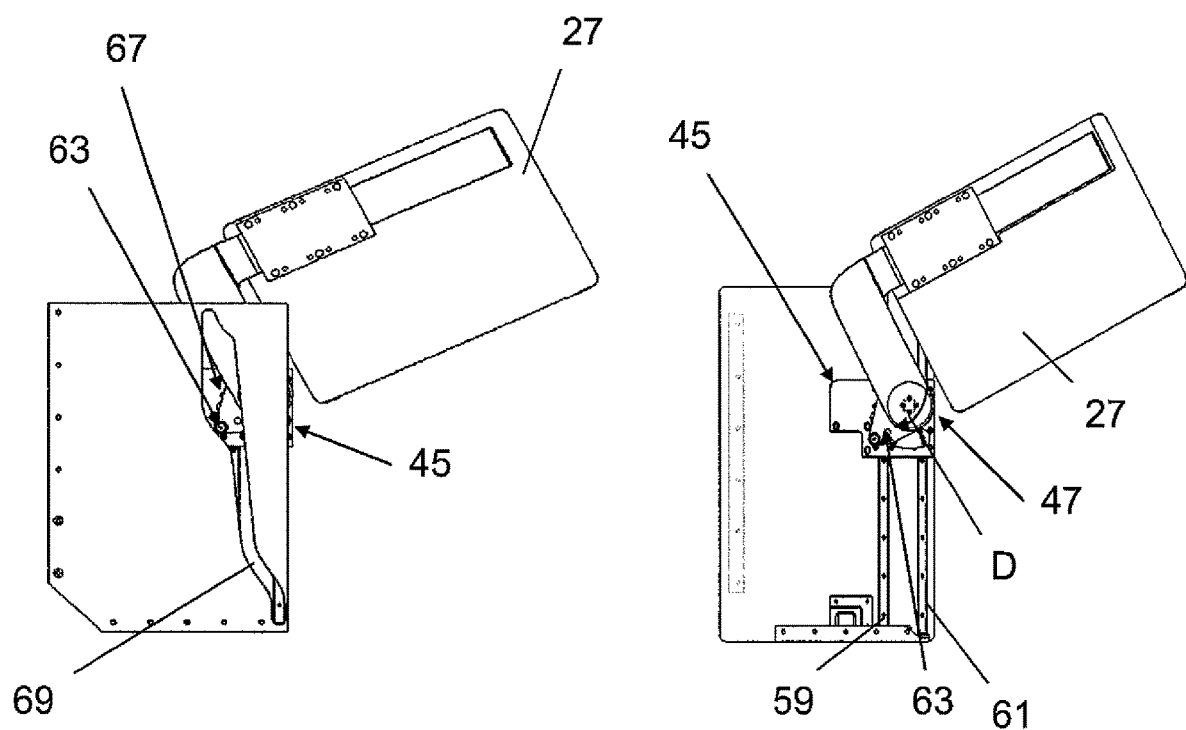
FIG. 3e is a bottom view of the table apparatus of FIG. 3d in yet another intermediate deployed position.
FIG. 4e is a top view of the table apparatus of FIG. 4d in the yet another intermediate deployed position.
Figure 4F:
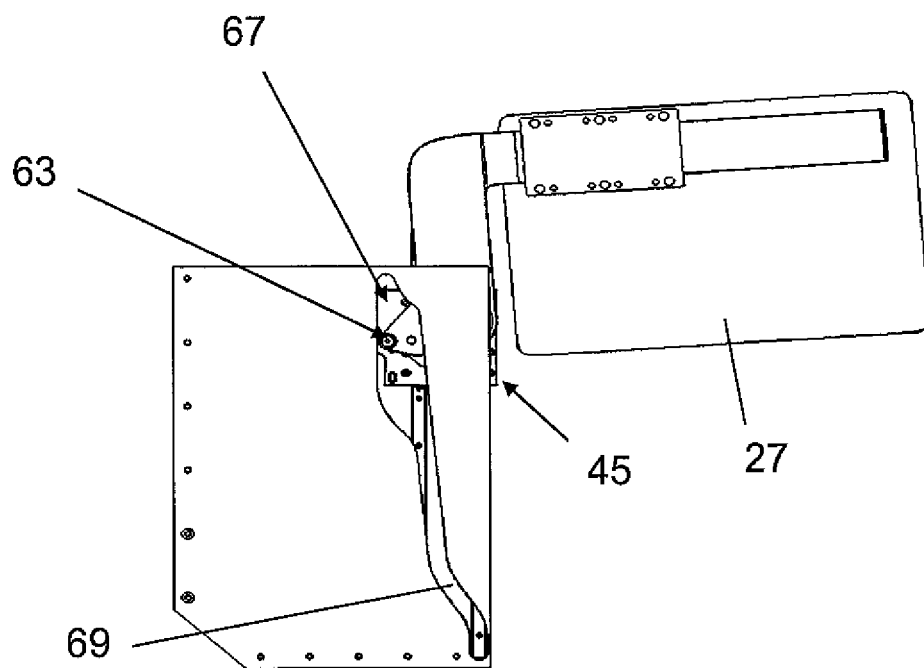
FIG. 4f is a top view of the table apparatus of FIG. 4e in the yet another intermediate deployed position.
Figure 4G:
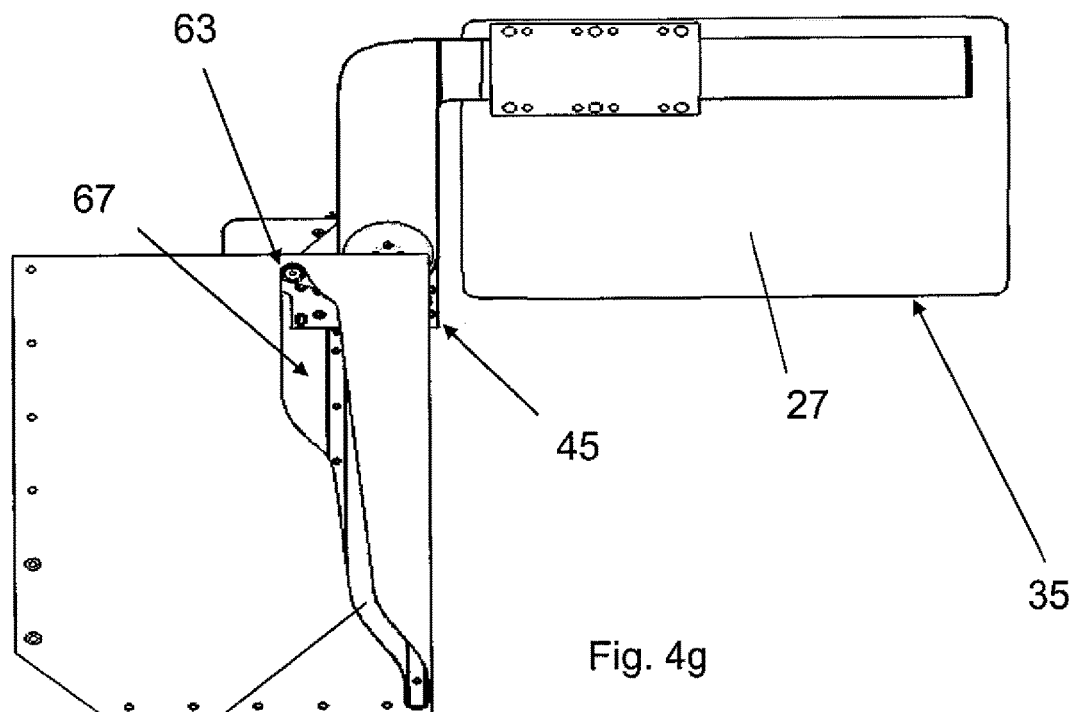
FIG. 4g is a top view of the table apparatus of FIG. 4e in the fully deployed position.

FIGS. 4a-4g are top views of the table apparatus 25 as the table apparatus moves from the stowed position 29 as shown in FIG. 4a through the intermediate deployed positions as shown in FIGS. 4b-4f to the fully deployed position 35 as shown in FIG. 4g. The table apparatus 25 is able to move from the fully deployed position 35 as shown in FIG. 4g through the intermediate deployed positions as shown in FIGS. 4f, 4e, 4d, 4c and 4b to the stowed position as shown in FIG. 4a.

The movement of the table apparatus 25 will be described based on FIGS. 3a-4g. As shown in FIGS. 1a, 3a and 4a, the table apparatus 25 is in a stowed position 29 in the console 19. In the stowed position 29, the outer table surface 28 extends parallel to a longitudinal axis 73 of the rail assembly 57. The latch release mechanism 31 is actuated by pressing the table apparatus against the latch release mechanism 31. After the latch release mechanism is in the released state, the table apparatus 25 is moved by a passenger such that the carrier structure 45 moves along the rail assembly 57 and the guide member 63 moves along the guide track 67. In another embodiment, a drive unit may move the table apparatus 25 after the latch release mechanism is in the released state. As shown in FIGS. 3a-3g, the table support linkage 43, the table linkage connecting structure 53 and the table device 27 rotate (pivot) about a single pivot axis 71 relative to the carrier structure 45 as the table support linkage 43, the table linkage connecting structure 53 and the table device 27 rotate (pivot) move along the table apparatus movement path 39. The pivot axis 71 is the only axis that the table support linkage 43, the table linkage connecting structure 53 and the table device 27 rotate about and the pivot axis 71 is the only pivot axis provide in the table apparatus 27. As shown in FIGS. 1d, 1e, 3g and 4g, the table device 27, the table linkage connecting structure 53 and the first table support linkage member 49 extend in a direction traversing the direction of travel F of the vehicle in the fully deployed position 35. In particular, the table device 27, the table linkage connecting structure 53 and the first table support linkage member 49 are perpendicular to the longitudinal axis 73 of the rail assembly 57. The carrier structure 45 is locked in position via the latch release mechanism 31 after the carrier structure 45 reaches an end 75 of the rail assembly 57.

Figure 5:
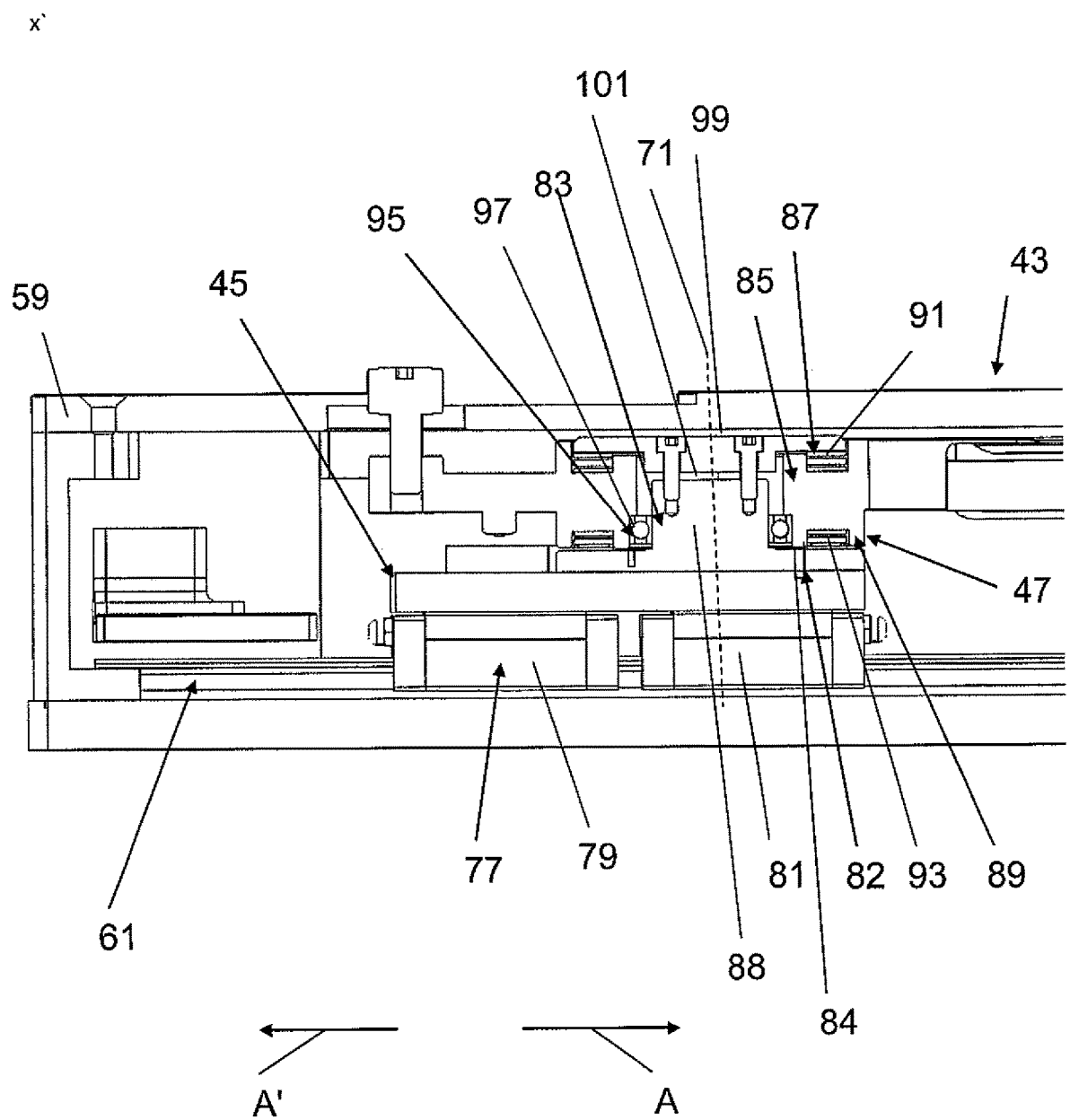
FIG. 5 is a cross sectional view along line 10-10 of FIG. 3g.

FIG. 5 is a cross sectional view along line 10-10 of FIG. 3g in an area of the pivot connection 47. The carrier structure 45 is connected to a carrier mounting structure 77. The carrier mounting structure 77 includes a first slide structure 79 and a second slide structure 81. Although two slide structures are shown, it is understood that any number of slide structures could be provides or that one slide structure could be used. The first slide structure 79 and the second slide structure 81 are movably connected to the rail (track) member 61 such that the first slide structure 79 and the second slide structure 81 are movable along the rail (track) member 61 relative to the rail (track) member 61. The first slide structure 79 and the second slide structure 81 may be connected to the rail (track) member 59. The carrier structure 77 moves in the direction A when the first slide structure 79 and the second slide structure 81 moves in the direction A. The carrier structure 77 moves in the direction A' when the first slide structure 79 and the second slide structure 81 moves in the direction A'. The pivot connection includes a pivot base structure 83 and a bearing arrangement 85. The pivot base structure 83 includes a pivot base shaft 88. The pivot base structure 83 is connected to the carrier structure 77 via a fastener 82. The fastener 82 is shown as a pin 84, but it is understood that any fastener may be used, such as a screw, a bolt or rivet. The bearing arrangement 85 includes bearings 87, 89, 95. The bearing 87 is a thrust bearing 91 and the bearing 89 is a thrust bearing 93. The bearing 95 is a radial bearing 97. In another embodiment (not shown), Delrin bushings may be used. The table support linkage 43 includes a recess 101. A cap 99 is connected to the table support linkage 43. At least a portion of the cap 99 is arranged in the recess 101. The table support linkage 43 pivots relative to the pivot base structure 83 and the carrier structure 45 and the carrier mounting structure 77 about the pivot axis 71.

While specific embodiments of the invention have been shown and described in detail to illustrate the application of the principles of the invention, it will be understood that the invention may be embodied otherwise without departing from such principles.

What is claimed is:

1. A table apparatus comprising:
   a table device;
   a latch release mechanism comprising a movable latch, wherein, in a stowed position of said table device, said latch release mechanism being configured to be unlocked by pressing said table device against said movable latch such that said movable latch moves from a locked position to an unlocked position to release said table device out of said stowed position;
   a table support structure connected to said table device, said table support structure comprising a carrier structure and a table support linkage, said carrier structure being connected to said table support linkage via a pivot connection;
   a track structure;
   a guide track; and
   a guide pin arranged in said guide track, said guide pin being connected to said carrier structure, wherein said carrier structure is movably mounted to said track structure such that said carrier structure moves in a linear direction and said guide pin moves in said guide track when said carrier structure moves in said linear direction.

2. The table apparatus in accordance with claim 1, wherein said table device is movable between said stowed position and a deployed position based on movement of said carrier structure and said table support linkage, said table device comprising an outer edge surface, said outer edge surface defining one lateral side of said table device in said stowed position, said outer edge surface defining a rear side of said table device in said deployed position.

3. The table apparatus in accordance with claim 2, wherein said outer edge surface is parallel to said track structure in said stowed position, said outer edge surface being perpendicular to said track structure in said deployed position.

4. The table apparatus in accordance with claim 2, wherein said track structure and said guide track are connected to a console structure located adjacent to a vehicle seat structure, said console structure comprising an opening, at least a portion of said table device being arranged in said opening in said stowed position, said deployed position being located outside of said opening.

5. The table apparatus in accordance with claim 2, wherein said table support linkage comprises a first table support linkage member and a second table support linkage member, said first table support linkage member being perpendicular to said second table support linkage member.

6. The table apparatus in accordance with claim 5, wherein said first table support linkage member is perpendicular to said track structure when said table device is in said stowed position, said first table support linkage member being parallel to said track structure in said deployed position, said second table support linkage member being parallel to said track structure when said table is in said stowed position, said second table support linkage member being perpendicular to said track structure when said table device is in said deployed position.

7. The table apparatus in accordance with claim 1, wherein said pivotable connection is defined by said carrier structure and said table support linkage.

8. The table apparatus in accordance with claim 1, wherein said table support linkage pivots about a single pivot axis relative to said carrier structure, wherein said table device pivots only about said single pivot axis.

9. A table apparatus comprising:
   a table device;
   a table support structure connected to said table device, said table support structure comprising a carrier structure and a table support linkage, said carrier structure being connected to said table support linkage via a pivot connection, said table support structure defining a single pivot point, wherein said table device pivots about only said single pivot point in a pivoting movement;
   a track structure;
   a guide track; and
   a guide pin arranged in said guide track, said guide pin being connected to said carrier structure, wherein said carrier structure is movably mounted to said track structure such that said carrier structure moves in a linear direction in a linear movement by moving said guide pin in said guide track when said carrier structure moves in said linear direction, and said table device is movable between a stowed position and a deployed position based on said linear movement of said carrier structure and said pivoting movement of said table device in one horizontal plane.

10. The table apparatus in accordance with claim 9, wherein said carrier structure and said table support linkage define said single pivot point, wherein said table support linkage pivots about said single pivot point relative to said carrier structure, wherein said table device pivots only about said single pivot point relative to said carrier structure.

11. A table apparatus in accordance with claim 10, wherein said table device is movable between said stowed position and said deployed position based on movement of said carrier structure and said table support linkage, said table device comprising an outer edge surface, said outer edge surface defining one lateral side of said table device in said stowed position, said outer edge surface defining a rear side of said table device in said deployed position.

12. A table apparatus comprising:
   a table device;
   a latch release mechanism comprising a movable latch, wherein, in a stowed position of said table device, said latch release mechanism being configured to be unlocked by pressing said table device against said movable latch such that said movable latch moves from a locked position to an unlocked position to release said table device out of said stowed position; and
   a table support structure connected to said table device, said table support structure comprising a carrier structure and a table support linkage, said carrier structure being connected to said table support linkage via a pivot connection, wherein said table support linkage pivots about a single pivot axis relative to said carrier structure, wherein said table device pivots only about said single pivot axis.

* * * * *